United States Patent
Nguyen et al.

(10) Patent No.: US 9,712,553 B2
(45) Date of Patent: Jul. 18, 2017

(54) SYSTEM AND METHOD FOR DEVELOPING A CYBER-ATTACK SCENARIO

(71) Applicant: The Boeing Company, Chicago, IL (US)

(72) Inventors: Daniel Nguyen, Auburn, WA (US); Jason W. Shelton, Edgewood, WA (US); Timothy M. Mitchell, Seattle, WA (US)

(73) Assignee: The Boeing Company, Chicago, IL (US)

(*) Notice: Subject to any disclaimer, the term of this patent is extended or adjusted under 35 U.S.C. 154(b) by 117 days.

(21) Appl. No.: 14/671,557

(22) Filed: Mar. 27, 2015

(65) Prior Publication Data
US 2016/0285907 A1    Sep. 29, 2016

(51) Int. Cl.
G06F 11/00 (2006.01)
H04L 29/06 (2006.01)
B64F 5/60 (2017.01)

(52) U.S. Cl.
CPC ........... H04L 63/1433 (2013.01); B64F 5/60 (2017.01)

(58) Field of Classification Search
CPC .................................................. H04L 63/1433
USPC ............................................................ 726/25
See application file for complete search history.

(56) References Cited

U.S. PATENT DOCUMENTS 8,616,884 B1 * 12/2013 Lechner ................... G09B 9/12
434/35
8,712,744 B1 * 4/2014 Sampigethaya ......... G08G 5/00
701/120

OTHER PUBLICATIONS

Mike Heiges, "How to Safely Flight Test a UAV Subject to cyber-attacks" 2014.*
Tomas Schober, Possibilities of Countering the Air Threat and Prevention Against IT. 2012.*
Matthias Schafer, Experimental Analysis of Attacks on Next Generation Air Traffc Communication; 2013.*
Ahmad Y. Javaid, UAVSIM: A Simulation Testbed for Unmanned Aerial Vehicle Network Cyber Security Analysis; 2013.*
Pasciuti, "New Potential Terror Threat: Cyber Attacks on Aircraft," *Prophecy News Watch* (2014).

* cited by examiner

*Primary Examiner* — Samson Lemma
(74) *Attorney, Agent, or Firm* — Walters & Wasylyna LLC

(57) ABSTRACT

A cyber-attack scenario simulation system and method may include an aircraft simulator operable to generate an aircraft simulation, a cyber-attack generator operable to generate a cyber-attack simulation, a cyber defense generator operable to generate a cyber defense simulation, a scenario generator operable to generate a cyber-attack scenario including the cyber attack simulation and the cyber defense simulation and launch the cyber-attack scenario against the aircraft simulation, and a cyber-attack scenario analysis tool operable to assess an impact of the cyber-attack scenario on the aircraft simulation.

20 Claims, 8 Drawing Sheets

SYSTEM AND METHOD FOR DEVELOPING A CYBER-ATTACK SCENARIO

FIELD

The present disclosure is generally related to data processing and, more particularly, to systems and methods for processing response data from a simulated cyber-attack scenario on an aircraft and proactively developing cyber defenses.

BACKGROUND

Modern aircraft often include a number of data processing systems, referred to generally as aircraft systems, used to perform various functions for the aircraft, such as monitoring flight sensors, controlling aircraft operations, communicating with other components of the aircraft, and the like. Aircraft systems interface with different types of aircraft networks to exchange digital information. Due to the structure of certain aircraft networks, cyber-attacks on the aircraft systems may be a problem. Because the amount of digital information required for operating and maintaining an aircraft is steadily increasing, the importance of protecting aircraft systems from cyber-attacks is also increasing.

Traditional cybersecurity is aimed at preventing a cyber-attack or mitigating the effects from a cyber-attack on a computer system. Recently, development of responses to a cyber-attack (also known as cyber defenses) includes simulating one or more cyber-attack scenarios on the computer system, analyzing the effects of the simulated cyber-attack on the computer system and developing cyber defenses configured to respond to the effects of the simulated cyber-attack on the computer system.

While traditional cybersecurity may protect the hardware and/or software of aircraft networks and/or systems from certain types of cyber-attacks, there is currently no way to simulate the effects on a pilot of the aircraft in response to the cyber-attack on one or more aircraft systems or proactively develop cyber-attack defenses for the aircraft. Disadvantageously, such conventional cybersecurity standards are constantly in a reactive state (e.g., reactive cyber defenses). This is primarily due to analysis of the simulated cyber-attack scenario being directed to only the hardware and software systems of the aircraft, which by its very nature is reactionary and only provides a partial view of the end-effects of the cyber-attack on the aircraft. Therefore, the effects of the cyber-attack on the pilot and/or any other non-hardware/software system related to the aircraft must be theorized.

Accordingly, those skilled in the art continue with research and development efforts in the field of cyber-attack security for aircraft systems.

SUMMARY

In one embodiment, the disclosed cyber-attack scenario simulation system may include an aircraft simulator operable to generate an aircraft simulation, a cyber-attack generator operable to generate a cyber-attack simulation, a cyber defense generator operable to generate a cyber defense simulation, a scenario generator operable to generate a cyber-attack scenario including the cyber attack simulation and the cyber defense simulation and to launch the cyber-attack scenario against the aircraft simulation, and a cyber-attack scenario analysis tool operable to assess an impact of the cyber-attack scenario on the aircraft simulation.

In another embodiment, the disclosed method for developing a cyber-attack scenario simulation may include the steps of: (1) generating an aircraft simulation, (2) generating a cyber-attack simulation, (3) generating a cyber defense simulation, (4) generating a cyber-attack scenario including the cyber-attack simulation and the cyber defense simulation, (5) launching the cyber-attack scenario against the aircraft simulation, and (6) assessing an impact of the cyber-attack scenario on the aircraft simulation and a pilot response.

In yet another embodiment, the disclosed computer program product may include a non-transitory computer readable medium, and program code, stored on the non-transitory computer readable medium, for: (1) generating an aircraft simulation, (2) generating a cyber-attack simulation, (3) generating a cyber defense simulation, (4) generating a cyber-attack scenario including the cyber-attack simulation and the cyber defense simulation, (5) launching the cyber-attack scenario against the aircraft simulation, and (6) assessing an impact of the cyber-attack scenario on the aircraft simulation and a pilot response.

Other embodiments of the disclosed systems and method will become apparent from the following detailed description, the accompanying drawings and the appended claims.

DETAILED DESCRIPTION

Figure 1:
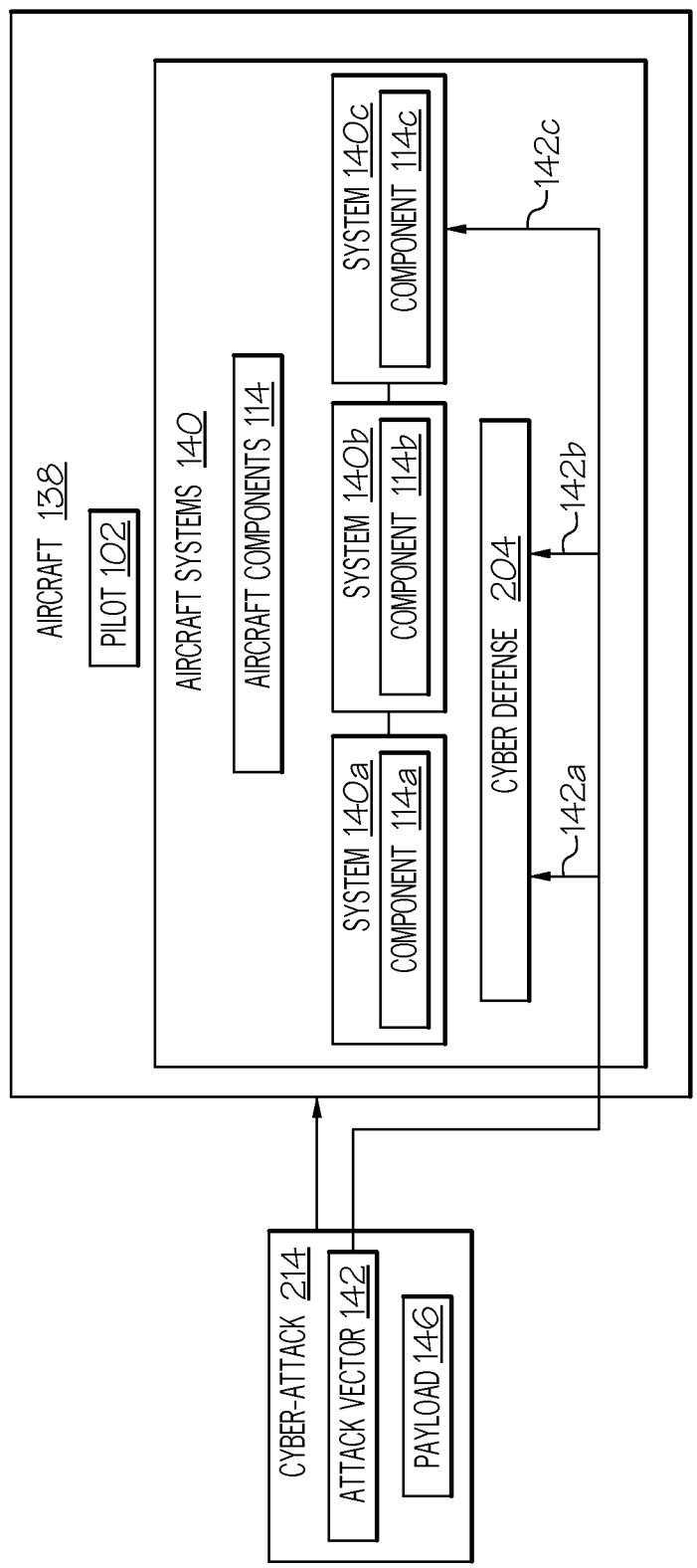
FIG. 1 is a block diagram of one embodiment of an aircraft targeted by a cyber-attack.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

The present disclosure recognizes and takes into account that it may be desirable to perform various simulations of aircraft systems and/or aircraft networks for various purposes. For example, it may be desirable to simulate the effects of a cyber-attack on the aircraft systems and/or networks. In performing these simulations, many different numbers and types of components may need to be simulated. Such components may be located on the aircraft as part of the aircraft systems and/or aircraft networks or outside of the aircraft.

The present disclosure further recognizes and takes into account that the end-effect of a cyber-attack on an aircraft may include a combination of the response of the aircraft systems and/or networks and the reaction of a pilot due to the cyber-attack. Therefore, it may be desirable to assess and quantify both aircraft system and/or network response and pilot reaction to one or more simulated cyber-attacks on the aircraft.

The present disclosure further recognizes and takes into account that it may be desirable to generate one or more cyber-attack defenses to mitigate the effect on the aircraft and/or the pilot from one or more cyber-attacks on one or more aircraft systems and/or aircraft networks.

The present disclosure further recognizes and takes into account that it may be desirable to modify the types of components used in aircraft systems and/or networks. These modifications may include the use of new components or may include changes in existing components.

The present disclosure further recognizes and takes into account that it may be desirable to designate a particular component or aircraft system or network to be targeted by the simulated cyber-attack and/or segregate particular components or aircraft systems or networks being the target of the simulated cyber-attack.

Thus, embodiments of the systems and methods described herein may provide for simulating aircraft systems and/or networks, simulating cyber-attacks on the aircraft systems and/or networks, modifying and/or segregating particular components of the aircraft systems and/or networks and analyzing the effects of the cyber-attack on the aircraft systems and/or networks and the reaction of the pilot to proactively develop cyber defenses for cyber-attacks on the aircraft.

Referring to FIG. 1, one embodiment of aircraft 138 may include one or more aircraft systems and/or aircraft networks (generally referred to herein as "aircraft systems" 140). Aircraft systems 140 may include any number of systems and/or networks of aircraft 138 (identified individually as system 140a, system 140b, system 140c, etc.) Aircraft systems 140 may include any high-level systems, operational subsystems and/or other resources (e.g., sensors, detectors, etc.) that are cooperatively configured to control essentially all operational aspects of aircraft 138 and used during any phase of flight. Aircraft systems 140 may be located inside aircraft 138, outside aircraft 138 or a combination thereof.

Aircraft systems 140 may include hardware, software or a combination thereof. As general, non-limiting examples of aircraft systems 140 may include, but are not limited to, aircraft data processing systems, propulsion systems, electrical systems, communications systems, instrument guidance systems, flight control systems, automatic pilot systems, navigation systems, path planning systems, emergency landing systems, collision avoidance systems, aircraft monitoring systems, display systems, weather systems, fuel management systems and/or other aircraft management systems. As specific, non-limiting examples, aircraft systems 140 (e.g., inside aircraft 138) may include, but are not limited to, a flight control computer ("FCC"), an auto-throttle computer, a flight management computer ("FMC"), an aircraft conditioning and monitoring function ("ACMF"), a stall warning computer and/or other electronic avionics. Additionally, aircraft systems 140 (e.g., outside aircraft 138) may include, but are not limited to, a global positioning system, a differential global positioning system, radar, weather radar, and the like.

Additionally, aircraft systems 140 may include systems and/or subsystems used in communications between aircraft systems 140 in aircraft 138, between aircraft 138 and other aircraft, and/or between aircraft 138 and equipment outside aircraft 138.

Each aircraft system 140 (e.g., system 140a, system 140b, system 140c) may include equipment that uses one or more aircraft components 114 (identified individually as component 114a, component 114b, component 114c, etc.) configured to perform various operations for a corresponding system and/or network of aircraft 138. Aircraft components 114 may include hardware, software or a combination thereof.

Those skilled in the art will recognize that different types of aircraft may have different types of systems, subsystems or combinations thereof. Those skilled in the art will also recognize that different types of aircraft systems may have different types of equipment that use different components or combinations of components. Similarly, equipment outside of the aircraft may use different systems, components or combinations thereof. As a result, the number and/or type of aircraft systems 140 and/or aircraft components 114 associated with aircraft 138 may vary. For example, aircraft systems 140 and/or aircraft components 114 may vary based on the type, model, options, configurations of airline modifiable information ("AMI"), and/or other attributes of aircraft 138.

Those skilled in the art of cybersecurity will recognize that aircraft systems 140 and/or aircraft components 114 may be vulnerable to cyber-attack 214.

Cyber-attack 214 may be directed against aircraft 138 (e.g., one or more aircraft systems 140 and/or aircraft components 114). Cyber-attack 214 may include any type of offensive maneuver, for example, employed by individuals or organizations (also known as "hackers"), that targets computer information systems, infrastructures, computer networks, and/or any other hardware or software system of aircraft 138 by exploiting vulnerabilities (e.g., weaknesses) in and affecting a targeted system of aircraft 138, for example, one or more aircraft systems 140 and/or one or more aircraft components 114. In other words, a cyber-attack may be any attack on computers and/or information on the computers caused by malicious computer code. For example, a cyber attack may alter, disrupt, steal, deny, degrade, and/or destroy the computers and/or information.

Cyber-attack 214 may include one or more attack vectors 142. Attack vector 142 may be a path or tool by which cyber attack 214 gains access to the targeted aircraft system 140 and/or aircraft component 114 in order to deliver and/or leave payload 146. Attack vector 142 may enable the hacker to exploit vulnerabilities in aircraft systems 140 and/or aircraft components 114, including the human element (e.g., pilot interaction with aircraft 138). Payload 146 may include, for example, viruses, Trojan horses, worms, malware, spyware or any other malicious software delivered by way of attack vector 142. In other words, attack vectors may represent one or more illicit actions performed on the aircraft and may include physical and associated logical paths that are taken through the aircraft infrastructure (e.g., aircraft system or network) to reach its target (e.g., aircraft systems and/or components). Illicit actions may include those actions that exploit external vulnerabilities, internal vulnerabilities, or cascading vulnerabilities of the aircraft infrastructure.

Aircraft systems 140 may further include one or more cyber defenses 204 configured to block attack vector 142 of cyber-attack 214. Cyber defenses 204 may include hardware, software or a combination thereof. For example, cyber defense 204 may include, but is not limited to, firewalls, anti-virus software or any other protection against cyber-attack 214.

Those skilled in the art of cybersecurity will recognize that no cyber defense can totally protect a computer system from a cyber-attack. For example, a cyber defense that is effective today may not remain effective for long. This is primarily due to hackers constantly updating attack vectors and/or creating new attack vectors in order to gain unauthorized access to the computer system.

This is best illustrated in FIG. 1, where cyber defense 204 may block attack vector 142a targeting system 140a and/or component 114a and attack vector 142b targeting system 140b and/or component 114b, but may fail to block attack vector 142c targeting system 140c and/or component 114c. Accordingly, improvements to existing cyber defenses and/or development of new cyber defenses remain in a reactive state and are constantly being updated in response to new and/or different attack vectors.

Figure 2:
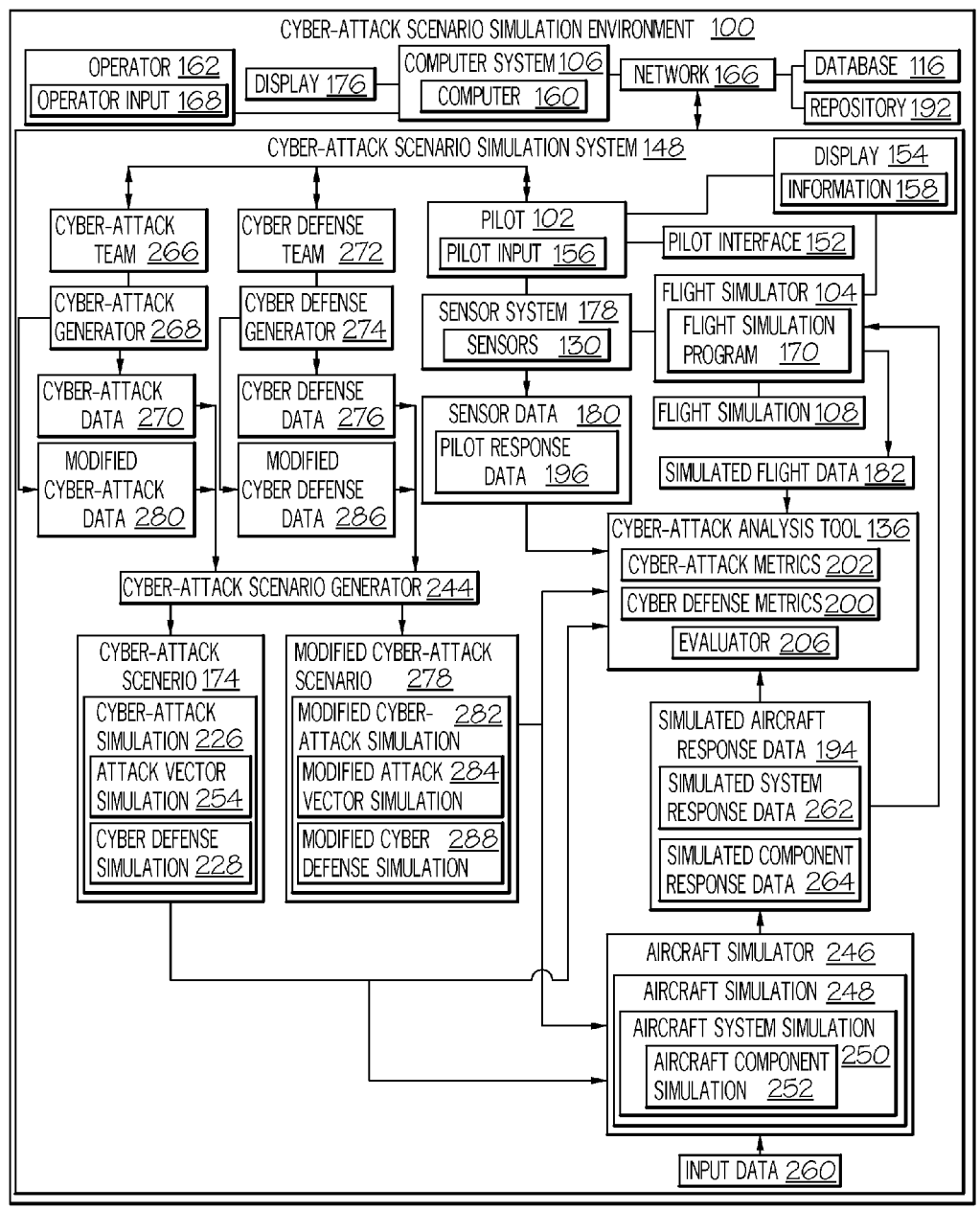
FIG. 2 is a block diagram of one embodiment of the disclosed cyber-attack scenario simulation environment.

FIG. 2 illustrates one embodiment of cyber-attack scenario simulation environment, generally designated 100, for proactively developing a cyber-attack scenario for an aircraft. Cyber-attack scenario simulation system 148 may be configured to (e.g., operable to) set up and run a simulation of cyber-attack 214 on aircraft 138 (e.g., a simulation of cyber-attack 214 on one or more aircraft systems 140 and/or aircraft components 114) (FIG. 1).

Cyber-attack scenario simulation system 148 may include cyber-attack scenario generator 244. Cyber-attack scenario generator 244 may be configured to (e.g., operable to) generate and launch cyber-attack scenario 174 against aircraft simulation 248. For example, cyber-attack scenario generator 244 may include any hardware and/or software device configured to run one or more computer-implemented processes (e.g., via computer system 106) to generate and run cyber-attack scenario 174.

Cyber attack scenario 244 may include one or more cyber-attack simulations 226. Cyber-attack simulation 226 may be an artificial re-creation (e.g., a virtual representation) of cyber-attack 214 directed against one or more aircraft systems 140 and/or aircraft components 114 (FIG. 1). Cyber-attack simulation 226 may include one or more attack vector simulations 254. Attack vector simulation 254 may be an artificial re-creation (e.g., a virtual representation) of attack vector 142 (FIG. 1). In other words, cyber-attack simulation 226 may be a simulated re-creation of a cyber-attack (e.g., cyber-attack 214) on an aircraft (e.g., aircraft 138) and/or one or more systems and/or component of the aircraft (e.g., aircraft systems 140 and/or aircraft components 114), including the path taken by the cyber-attack to gain access to the targeted systems and/or components of the aircraft (e.g., attack vector 142) and the effect of the payload (e.g., payload 146) of the cyber-attack on the systems and/or components of the aircraft.

Cyber-attack scenario 174 may further include one or more cyber defense simulations 228. Cyber defense simulation 228 may be an artificial re-creation (e.g., a virtual representation) of cyber defense 204 designed to block attack vector 142 of cyber-attack 214 on aircraft systems 140 and/or aircraft components 114 (FIG. 1). In other words, cyber defense simulation 228 may be a simulated re-creation of a cyber defense (e.g., cyber defense 204) used by the aircraft (e.g., aircraft 138) and/or one or more systems and/or components of the aircraft (e.g., aircraft systems 140 and/or aircraft components 114) to block the path taken by the cyber-attack (e.g., attack vector 142) and protect the systems and/or components of the aircraft from the cyber-attack (e.g., cyber-attack 214).

Cyber-attack scenario simulation system 148 may further include aircraft simulator 246. Aircraft simulator 246 may be configured to (e.g., operable to) generate aircraft simulation 248. Aircraft simulation 248 may include one or more aircraft system simulations 250 and/or one or more aircraft component simulations 252. Aircraft system simulation 250 may be an artificial re-creation (e.g., a virtual representation) of a system or network of aircraft 138 (e.g., aircraft system 140) (FIG. 1). Aircraft component simulation 252 may be an artificial re-creation (e.g., a virtual representation) of one or more components of aircraft 138 (e.g., aircraft components 114) (FIG. 1). For example, aircraft simulator 246 may include any hardware and/or software device configured to run one or more computer-implemented processes (e.g., via computer system 106) to re-create the operational parameters, characteristics and/or responses of aircraft systems 140 and/or aircraft components 114 using aircraft system simulation 248 and aircraft component simulation 252.

Figure 3:
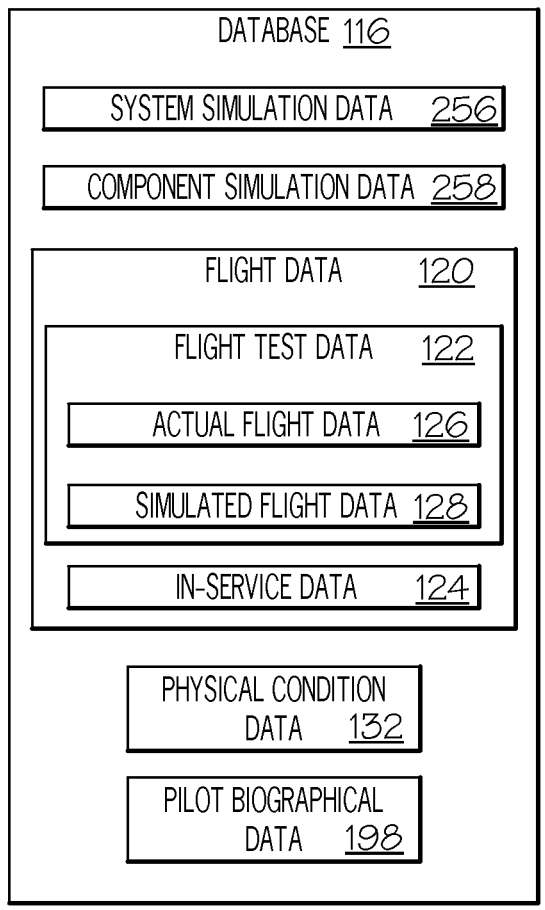
FIG. 3 is a block diagram of one embodiment of the database of FIG. 2.

Referring to FIG. 2, and with reference to FIG. 3, aircraft system simulation 250 may be generated, for example, by aircraft simulator 246, from system simulation data 256 (FIG. 3). System simulation data 256 may include data or information representing the behaviors, traits, and/or physical structures (referred to herein as system characteristics) of a corresponding aircraft system 140 and indicative of the performance of aircraft system simulation 250.

Aircraft component simulation 252 may be generated, for example, by aircraft simulator 246, from component simulation data 258. Component simulation data 258 may include data or information representing the behaviors, traits, and/or physical structures (referred to herein as component characteristics) of a corresponding aircraft component 114 and indicative of the performance of aircraft component simulation 252.

Referring to FIG. 2, and with reference to FIG. 3, system simulation data 256 and/or component simulation data 258 may be stored in database 116. Database 116 may be a storage device in communication with cyber-attack scenario simulation system 148. As one example, database 116 may be located in a remote location and, for example, in communication with computer system 106 (e.g., via network 166). As another example, database 116 may be part of computer system 106.

Aircraft simulator 246 may be configured to (e.g., operable to) generate simulated aircraft response data 194. Simulated aircraft response data 194 may be data generated by a program running on a computer system. Simulated aircraft response data 194 may include information generated by aircraft simulator 246 (e.g., via aircraft simulation 248, aircraft system simulation 250 and/or aircraft component simulation 252) representing flight parameters of aircraft 138 and operations of aircraft systems 140 and/or aircraft components 114 (FIG. 1) during various phases of flight. As one example, simulated system response data 262 may include response data for aircraft system simulation 248 in response to normal operating conditions of aircraft simulation 248. As another example, simulated component response data 264 may include response data for aircraft component simulation 252 in response to normal operating conditions of aircraft simulation 248.

Simulated aircraft response data 194 may further include information generated by aircraft simulator 246 (e.g., via aircraft simulation 248, aircraft system simulation 250 and/or aircraft component simulation 252) representing the effects of cyber-attack scenario 174 on aircraft system simulations 250 and/or aircraft component simulations 252. As one example, simulated system response data 262 may include response data for aircraft system simulation 248 in response to cyber-attack scenario 174 affecting aircraft simulation 248. As another example, simulated component response data 264 may include response data for aircraft component simulation 252 in response to cyber-attack scenario 174 affecting aircraft simulation 248.

Aircraft simulator 246 may be configured to generate simulated aircraft response data 194 based on, for example, the type of physical aircraft (e.g., aircraft 138), the types, systems and/or networks of the physical aircraft (e.g., aircraft systems 140), the types of components of the physical aircraft (e.g., aircraft components 114), the system characteristics, the component characteristics and/or any other suitable type of input data 260. For example, input data 260 may include system simulation data 256, component simulation data 258 and/or flight data 120.

As one non-limiting example, flight data 120 may include flight test data 122. Flight test data 122 may include data recorded from previous operations of the aircraft, simulations of the aircraft or a combination thereof. For example, flight test data 122 may include one or both of actual test data 126 and/or simulated test data 128.

As another non-limiting example, flight data 120 may include in-service data 124. Flight data 120 may be regularly or continuously updated by in-service data 124. In-service data 124 may be a type of actual flight data 126 that has been generated over the life of the aircraft. For example, in-service data 124 may be data generated by at least one of aircraft systems 140 and/or aircraft components 114 during actual use of aircraft 138.

In one example implementation, aircraft simulator 246 may use in-service data 124 to build on flight test data 122 (e.g., obtained in previous tests) to generate more accurate simulated aircraft response data 194 (e.g., for flight simulation 108). For example, flight data 120 used to run flight simulation 108 may include at least one of actual flight data 126 from tests of the aircraft prior to entering into service, simulated flight data 128 from previous simulations, and in-service data 124 (e.g., updating flight data 120 as it becomes available).

Input data 260 may also include physical condition data 132 for processing of flight simulation 108. Physical condition data 132 may include virtual representations of the physical conditions of aircraft 138, for example, during various phases of flight. Physical condition data 132 include attributes or physical characteristics of aircraft 138. For example, physical condition data 132 may include, but is not limited to, data and/or information representing the speed of the aircraft, the position of the aircraft, data loads, throttle settings, flap settings, control surfaces (e.g., slats, elevators, spoilers, ailerons, etc.), various flight phases (e.g., doors closed, engines operations, taxi, takeoff, climb, cruise, decent, flare, touchdown, break set, and air-ground transitions), communications with control centers, and other suitable data.

Figure 4:
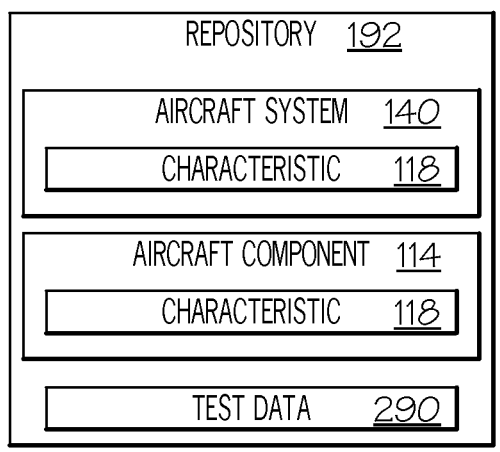
FIG. 4 is a block diagram of one embodiment of the repository of FIG. 2.

Referring to FIG. 2, and with reference to FIG. 4, cyber-attack scenario simulation environment 100 may also include repository 192, for example, managed by owners of aircraft systems 140 and/or aircraft components 114. Owners may be any entity that owns (e.g., manufactures, maintains and/or manages) one or more aircraft systems 140 and/or aircraft components 114. Aircraft systems 140 and/or aircraft components 114 may include characteristics 118. Characteristics may be behaviors, traits, and/or physical structures of aircraft systems 140 and/or aircraft components 114. Repository 192 may store data representing aircraft systems 140 and/or aircraft components 114, characteristics 118 and/or any test data 290 (e.g., managed by the owners). Data representing aircraft systems 140 and/or aircraft components 114, and/or characteristics 118 may be used as input data 260 (e.g., system simulation data 256 and/or component simulation data 258). Similarly, test data 290 may be used as input data 260.

Referring to FIG. 2, cyber-attack scenario environment 100 may include flight simulator 104. Flight simulator 104 may include any hardware and/or software device configured to run one or more computer-implemented processes (e.g., via computer system 106) to generate and run flight simulation 108, for example, from simulated aircraft response data 194.

Referring to FIG. 2, and with reference to FIG. 1, flight simulator 104 may be configured to artificially re-create the flight of aircraft 138 (FIG. 1) and the environment in which aircraft 138 flies as flight simulation 108. Flight simulation 108 may be generated by a program running on a computer system. For example, flight simulation 108 may be generated by flight simulation program 170 of flight simulator 104.

As one example, flight simulator 104 (e.g., via flight simulation program 170) may utilize simulated aircraft response data 194 to replicate the equations that govern how aircraft 138 flies, how aircraft 138 reacts to the application of flight controls (e.g., via pilot interface 152), how aircraft 138 reacts to external factors such as air density, turbulence, wind shear, cloud cover, precipitation and the like. As another example, flight simulator 104 may reflect the effects of cyber-attack 214 on aircraft systems 140 and/or aircraft components 114 during flight simulation 108. For instance, simulated aircraft response data 194 may include simulated system response data 262 and/or simulated component response data 264. Simulated system response data 262 may include data and/or information representing the effect of cyber-attack scenario 174 on aircraft system simulations 250. Simulated component response data 264 may include data and/or information representing the effect of cyber-attack scenario 174 on aircraft component simulations 252.

Cyber-attack scenario simulation environment 100 may further include pilot 102, pilot interface 152, and display 154. Pilot 102 may interact with flight simulator 104 during flight simulation 108. Pilot 102 may provide various pilot inputs 156 to pilot interface 152. Pilot interface 152 may facilitate interaction between pilot 102 and aircraft simulation 248 (e.g., through flight simulator 104) during flight simulation 108. Pilot interface 152 may be a virtual implementation (e.g., a constructive representation) of various avionics controls of the physical aircraft (e.g., aircraft 138). For example, pilot 102 may enter pilot inputs 156 into pilot interface 152 using one or more of a keyboard, a mouse, a joystick, a microphone, a touch screen, switches, or any other suitable types of input devices.

Display 154 may provide a mechanism to display information 158 to pilot 102 during flight simulation 108. For example, information 158 may include a virtual implementation (e.g., a constructive representation) of a glass cockpit and/or various instrument displays of the physical aircraft (e.g., aircraft 138) including, but not limited to, electronic (e.g., digital) instrument displays, analog dials, gauges, and the like. Display 154 may include, but is not limited to a computer screen, a tablet, a touch screen device, or any other suitable type of display device. Display 154 may include any number of display devices.

In one example embodiment, cyber-attack scenario simulation environment 100 may include operator 162 (e.g., "white team" or neutral team). Operator 162 may manage aircraft simulator 246 prior to and during launch of cyber-attack scenario 174 and/or flight simulator 104 during flight simulation 108. For example, computer system 106 may facilitate interaction between operator 162 and aircraft simulator 246 and/or flight simulator 104. For example, operator 162 may enter operator inputs 168 into computer system 106. For example, operator inputs 168 may include one or more simulation parameters for aircraft simulation 248 (e.g., a selection of input data 260) and/or flight simulation 108 such as the particular phase of flight in which cyber-attack scenario 174 will be launched.

Computer system 106 may provide a capability to view flight simulations 108 that occur. For example, operator 162, cyber-attack team 266 and/or cyber defense team 272 may use computer system 106 during flight simulation 108 to view (e.g., as graphical representations on display 176) sensor data 180, simulated aircraft response data 194 and/or the simulated flight data 182 as they occur (e.g., in real time). Computer system 106 may also be used to provide a debriefing and/or analysis of cyber-attack scenario 174 after flight simulation 108 has completed (e.g., from recorded sensor data 180, simulated aircraft response data 194 and/or the simulated flight data 182).

Flight simulator 104 may be further configured to (e.g., operable to) generate simulated flight data 182. Simulated flight data 182 may include information generated by flight simulator 104 (e.g., via flight simulation 108) representing the real time flight parameters (e.g., physical conditions) of aircraft simulation 248 and operations of aircraft system simulation 250 and/or aircraft component simulation 252 during various phases of flight simulation 108, for example, in response to pilot input 156. For example, simulated flight data 182 may include response data and/or information representing the flight parameters of aircraft simulation 248 (e.g., changes in speed, altitude, direction, etc.) in response to a pilot reaction to a successful cyber-attack simulation 226 on a targeted aircraft system simulation 250 and/or an aircraft component simulation 252. Simulated flight data 182 may be provided to aircraft simulator 246 in order to continuously update simulated aircraft response data 194 (e.g., simulated system response data 262 and/or simulated component response data 264) during flight simulation 108.

As used herein, "successful cyber-attack simulation" generally refers to any particular cyber-attack simulation 226 and/or attack vector simulation 254 in which cyber defense simulation 228 fails to block attack vector simulation 254 (e.g., cyber defense simulation 228 fails to protect aircraft system simulation 250 and/or aircraft component simulation 252 from cyber-attack simulation 226).

In one example implementation, the flight parameters of aircraft simulation 248 (e.g., via simulated aircraft response data 194, simulated system response data 262 and/or simulated component response data 264 under normal operating conditions and in response to cyber-attack scenario 174) may be graphically presented to pilot 102 on display 154 during flight simulation 108.

Cyber-attack scenario simulation system 148 may further include one or more sensor systems 178. Sensor system 178 may generate sensor data 180 for pilot 102 during flight simulation 108. Sensor system 178 may include one or more sensors 130 capable of determining a reaction of pilot 102 during flight simulation 108 and, more particularly, during and/or following cyber-attack scenario 174 launched against aircraft simulation 248. For example, sensor data 180 may include response data for pilot 102 (e.g., pilot response data 196) in response to a successful cyber-attack simulation 226 on a targeted aircraft system simulation 250 and/or aircraft component simulation 252. Sensor system 178 may be an independent system or may be integrated into flight simulator 104. Sensor system 178 may include any suitable software or tool to output sensor data 180.

For example, sensors 130 may include eye tracking optical sensors, cameras (e.g., video cameras), or the like capable of determining (e.g., measuring) a point of gaze of pilot 102 (e.g., where pilot 102 is looking) and/or a duration of the point of gaze of pilot 102 (e.g., how long pilot 102 is looking). Accordingly, sensor data 180 may include at least one of a location of pilot gaze (e.g., relative to display 154), a change in location of pilot gaze, and/or a duration of pilot gaze at a given location during flight simulation 108.

Sensors 130 may also include any other suitable type of sensor capable of measuring one or more biometric responses of pilot 102 during flight simulation 108. For example, sensor data 180 may also include pilot blood pressure, heart rate, etc.

Cyber-attack scenario simulation system 148 may further include cyber-attack team 266 and cyber-attack generator 268. Cyber-attack team 266 (e.g., "red team") may be responsible for simulating a hacker threat on aircraft 138 (FIG. 1). Cyber-attack generator 268 may be any hardware and/or software device configured to run one or more computer-implemented processes (e.g., via computer system 106). As one example, cyber-attack generator 268 may be configured to generate a particular type of cyber-attack. As another example, cyber-attack generator 268 may be configured to generate a particular path taken by the cyber-attack (e.g., attack vector).

Cyber-attack generator 268 may be configured to (e.g., operable to) generate cyber-attack data 270. Cyber-attack data 270 may include data and/or information representing (e.g., defining) cyber-attack simulation 226 and/or attack vector simulation 254 (e.g., the type of cyber-attack, a feature or characteristic of the cyber-attack, how the cyber-attack vector may affect systems and/or components and/or other cyber-attack parameters), which are used by cyber-attack scenario generator 244 to generate cyber-attack scenario 174. For example, cyber-attack data 270 may be a virtual implementation of one or more cyber-attacks 214 (or cyber-attack vectors 142) that may be launched against an infrastructure of the physical aircraft (e.g., aircraft 138) and/or one or more systems and/or components of the aircraft system (e.g., aircraft systems 140 and/or aircraft components 114).

As one example, cyber-attack data 270 may be generated from known information about existing cyber-attacks. As another example, cyber-attack data 270 may be generated to represent a currently non-existent, but potentially harmful, cyber-attack that could target aircraft systems and/or components. Thus, cyber-attack data 270 may be generated for an existing cyber-attack having a known cyber-attack vector, for a non-existent cyber-attack (e.g., a cyber-attack generated specifically for cyber-attack scenario 174 having a predefined cyber-attack vector) or a combination thereof. Accordingly, the embodiments described herein may be used to proactively and/or predictively research, develop and/or evaluate new countermeasures (e.g., cyber-defense simulations 228) for cyber-attacks that are currently available and/or those yet to be introduced.

Cyber-attack scenario simulation system 148 may further include cyber defense team 272 and cyber defense generator 274. Cyber defense team 272 (e.g., "blue team") may be responsible for defense of a targeted system and/or component of the aircraft (e.g., aircraft systems 140 and/or aircraft components 114). Cyber defense generator 274 may be any suitable hardware and/or software device configured to run one or more computer-implemented processes (e.g., via computer system 106). As one example, cyber defense generator 274 may be configured to generate a particular type of cyber defense intended or designed to protect a targeted system and/or component of the aircraft (e.g., system 140 and/or component 114 of aircraft 138). As another example, cyber defense generator 274 may be configured to generate a particular type of cyber defense intended or designed to block a potential access point of an attack vector Cyber defense generator 274 may be configured to (e.g., operable to) generate cyber defense data 276. Cyber defense data 276 may include data and/or information representing (e.g., defining) cyber defense simulation 228 (e.g., the type of cyber defense, a feature or characteristic of the cyber defense, how the cyber defense blocks attack vector and/or other cyber defense parameters), which is used by cyber-attack scenario generator 244 to generate cyber-attack scenario 174.

Cyber-attack generator 268 may further utilize simulated aircraft response data 194 (e.g., simulated system response data 262 and/or simulated component response data 264), simulated flight data 182 and/or sensor data 180 (e.g., pilot response data 196) to generate cyber-attack data 270.

As one example, cyber-attack team 266 may develop cyber-attack simulation 226 (e.g., generated by cyber-attack generator 268 from cyber-attack data 270, simulated aircraft response data 194 and/or simulated flight data 182) designed to induce a particular effect one or more aircraft system simulations 250 and/or aircraft component simulations 252. For example, based on simulated aircraft response data 194 and/or simulated flight data 182, cyber-attack team 266 may be able to assess the ability of cyber-attack simulation 226 to penetrate cyber defense simulation 228 and assess the effectiveness the of cyber-attack simulation 226 on aircraft system simulation 250 and/or component simulation 252 and, thus, more accurately theorize the effect of cyber-attack 214 on aircraft systems 140 and/or aircraft components 114 (FIG. 1).

As another example, cyber-attack team 266 may develop cyber-attack simulation 226 (e.g., generated by cyber-attack generator 268 from cyber-attack data 270 and/or simulated aircraft response data 194) having a particular attack vector simulation 254 designed to target a particular aircraft system simulation 250 and/or aircraft component simulation 252. For example, based on simulated aircraft response data 194 (e.g., simulated system response data 262 and/or simulated component response data 264), cyber-attack team 266 may be able to assess whether attack vector simulation 254 successfully penetrated (e.g., bypassed or overcame) cyber defense simulation 228 (e.g., assess the ability of cyber-attack simulation 226 to penetrate cyber defense simulation 228) used by cyber-attack scenario 174 to protect aircraft system simulations 250 and/or aircraft component simulations 252 from cyber-attack simulation 226 and, thus, more accurately theorize the success of cyber-attack 214 on aircraft systems 140 and/or aircraft components 114 (FIG. 1).

As yet one example, cyber-attack team 266 may develop cyber-attack simulation 226 (e.g., generated by cyber-attack generator 268 from cyber-attack data 270, simulated flight data 182 and/or pilot response data 196) designed to induce a particular reaction or response by pilot 102 in response to cyber-attack simulation 226 targeting one or more aircraft system simulations 250 and/or aircraft component simulations 252. For example, based on simulated flight data 182 and/or pilot response data 196, cyber-attack team 266 may be able to assess the effectiveness of cyber-attack simulation 226 on pilot 196 and, thus, more accurately theorize the effect of cyber-attack 214 on aircraft 138 (FIG. 1).

Similarly, cyber defense generator 274 may further utilize simulated aircraft response data 194 (e.g., simulated system response data 262 and/or simulated component response data 264), simulated flight data 182 and/or sensor data 180 (e.g., pilot response data 196) to generate cyber defense data 276.

As one example, cyber defense team 272 may develop cyber defense simulation 228 (e.g., generated by cyber defense generator 274 from cyber defense data 276, simulated aircraft response data 194 and/or simulated flight data 182) designed to protect aircraft system simulations 248 and/or aircraft component simulations 252 from cyber-attack simulation 226 and/or block attack vector simulation 254. For example, based on simulated aircraft response data 194 and/or simulated flight data 182, cyber defense team 272 may be able to assess the effectiveness of cyber defense simulation 228 and, thus, more accurately theorize the effectiveness of cyber defense 204 against cyber-attack 214 (FIG. 1).

As another example, cyber defense team 272 may develop cyber defense simulation 228 (e.g., generated by cyber defense generator 274 from cyber defense data 276, simulated flight data 182 and/or pilot response data 196) designed to mitigate the effects on pilot 102 from cyber-attack simulation 226 targeting aircraft system simulation 250 and/or aircraft component simulation 252. For example, based on simulated flight data 182 and/or pilot response data 196, cyber defense team 272 may be able to assess the effectiveness of cyber defense simulation 228 and, thus, more accurately theorize the effectiveness of cyber defense 204 against cyber-attack 214 (FIG. 1).

In the embodiments described herein, various different cyber-attack scenarios, including various different simulated cyber-attacks, having various different attack vectors, and various different simulated cyber defenses, may be cooperatively developed in cyber-attack scenario simulation environment 100. Thus, the effects on the aircraft, the systems and components of the aircraft and/or the pilot due to various different types of cyber-attacks, including various different attack vectors, may be tested and analyzed. Similarly, various different cyber defenses may be developed, tested and analyzed as countermeasures against the cyber-attacks.

For example, cyber-attack scenario generator 244 may generate modified or new cyber-attack scenarios (referred to herein as "modified cyber-attack scenario" 278). As one example, cyber-attack generator 268 may utilize modified cyber-attack data 280, simulated aircraft response data 194, simulated flight data 182 and/or pilot response data 196 to define modified cyber-attack simulation 282 having modified attack vector simulation 284, which is used by cyber-attack scenario generator 244 to generate modified cyber-attack scenario 278. As another example, cyber defense generator 274 may utilize modified cyber defense data 286, simulated aircraft response data 194, simulated flight data 182 and/or pilot response data 196 to define modified cyber defense simulation 288, which is used by cyber-attack scenario generator 244 to generate modified cyber-attack scenario 278.

Thus, cyber-attack scenario simulation system 148 may provide for the design of cyber-attacks having unique attack vectors and/or pivot points constructed from both a hardware/software interaction and human interaction and cyber defenses designed to protect against the cyber-attacks. For example, cyber-attack scenario simulation system 148 may cooperatively develop new cyber-attacks, reveal newly compromised or vulnerable systems and/or components (e.g., new pivot points), which may ultimately reveal new attack vectors, and develop new cyber defenses effective against the newly developed cyber-attacks based on the reaction (e.g., real-time or recorded) of pilot 102 and information about cyber defense simulation 228.

Referring to FIG. 2, cyber-attack scenario simulation system 148 may further include cyber-attack analysis tool 136. Cyber-attack analysis tool 136 may assess an effect or impact of cyber-attack simulation 226 on aircraft simulation 248 (e.g., on one or more aircraft system simulations 250 and/or one or more aircraft component simulations 252) based on at least one of simulated aircraft response data 194 (e.g., simulated system response data 262 and/or simulated component response data 264), simulated flight data 182 and/or sensor data 180 (e.g., pilot response data 196).

Cyber-attack analysis tool 136 may generate cyber-attack metrics 202. Cyber-attack metrics 202 may be used to evaluate the effect or impact on aircraft simulation 248, aircraft system simulation 250, aircraft component simulation 252 and/or pilot 102 in response to cyber-attack simulation 226 and, thus, theorize the effect or impact on aircraft 138, aircraft systems 140, aircraft components 114 and/or pilot 102 in response to cyber-attack 214.

Cyber-attack metrics 202 associated with each cyber-attack simulation 226 (and modified cyber-attack simulation 282) may include data and/or information representing a quantification (e.g., a measure or score) and/or a qualification of the level of impact (e.g., adverse impact) on aircraft simulation 248 and/or pilot 102 in response to various aircraft system simulations 250 and/or aircraft component simulations 252 targeted by cyber-attack simulation 226. As one example, cyber-attack simulation 226 that causes a relatively large level of adverse impact on aircraft simulation 248 and/or pilot 102 may be assigned a relatively high value. As another example, cyber-attack simulation 226 that causes a relatively small level of adverse impact on aircraft simulation 248 and/or pilot 102 may be assigned a relatively low value. As another example, attack vector simulation 254 that successfully penetrates cyber defense simulation 228 and/or creates a new vulnerability in aircraft system simulation 250 and/or aircraft component simulation may be assigned a relatively high value. As yet another example, attack vector simulation 254 that unsuccessfully attempts to penetrate cyber defense simulation 228 and/or fails creates a new vulnerability in aircraft system simulation 250 and/or aircraft component simulation may be assigned a relatively low value.

As used herein, "impact" or "adverse impact" on aircraft simulation 248 generally refers to a detrimental effect on aircraft system simulation 250 and/or aircraft component simulation 252 that adversely or negatively effects control, operation or flight of the simulated aircraft, for example, during flight simulation 108, due to cyber-attack simulation launched against one or more aircraft system simulations 250 and/or aircraft component simulations 252.

Similarly, as used herein, "impact" or "adverse impact" on pilot 102 generally refers to a detrimental reaction or response of pilot 102 that adversely or negatively affects control, operation or flight of the simulated aircraft, for example, during flight simulation 108, due to cyber-attack simulation launched against one or more aircraft system simulations 250 and/or aircraft component simulations 252.

Thus, cyber-attack metrics 202 associated with each cyber-attack simulation 226 may represent the potential effect or impact of cyber-attack 214 on aircraft 138 and/or pilot 102 during flight.

Cyber-attack analysis tool 136 may also assess an effect or impact of cyber defense simulation 228 on cyber-attack simulation 226 (e.g., blocking attack vector simulation 254) based on at least one of simulated aircraft response data 194 (e.g., simulated system response data 262 and/or simulated component response data 264), simulated flight data 182 and/or sensor data 180 (e.g., pilot response data 196).

Cyber-attack analysis tool 136 may generate cyber defense metrics 200. Cyber defense metrics 200 may be used to evaluate the effectiveness of cyber defense simulation 228 against cyber-attack simulation 226 to protect aircraft simulation 248, aircraft system simulation 250, aircraft component simulation 252 and/or pilot 102 in response to cyber-attack simulation 226 and, thus, theorize the effect or impact on aircraft 138, aircraft systems 140, aircraft components 114 and/or pilot 102 in response to cyber-attack 214 with cyber-defense 204 used as a countermeasure.

Cyber defense metrics 200 associated with each cyber defense simulation 228 (and modified cyber defense simulation 288) may include data and/or information representing a quantification (e.g., a measure or score) and/or a qualification of the protection cyber-defense simulation 228 provides aircraft simulation 248 and/or pilot 102 in response to various aircraft system simulations 250 and/or aircraft component simulations 252 targeted by cyber-attack simulation 226. As one example, cyber defense simulation 228 that prevents cyber-attack simulation 226 from causing adverse impact on aircraft simulation 248 and/or pilot 102 and/or that blocks attack vector simulation 254 may be assigned a relatively high value. As another example, cyber-defense simulation 228 that fails to prevent cyber-attack simulation 226 from causing adverse impact on aircraft simulation 248 and/or pilot 102 and/or that is penetrated by attack vector simulation 254 may be assigned a relatively low value.

Cyber-attack analysis tool 136 may also include evaluator 206. Evaluator 206 may generate one or more recommendations (e.g., modified cyber-attack data 280) for modified cyber-attack simulation 282 and/or one or more recommendations (e.g., modified cyber defense data 286) for modified cyber defense simulation 288. For example, the impact on aircraft simulation 248, aircraft system simulation 250, aircraft component simulation 252 and/or pilot 102 from cyber-attack simulation 226 without implementing cyber defense simulation 228 may be compared to the impact on aircraft simulation 248, aircraft system simulation 250, aircraft component simulation 252 and/or pilot 102 from cyber-attack simulation 226 implementing cyber defense simulation 228.

Evaluator 206 may measure an effectiveness of cyber-attack simulation 226 against cyber defense simulation 228 and/or aircraft system simulation 250 and/or aircraft component simulation 252. Evaluator 206 may recommend modifications in cyber-attack simulation 226 (e.g., modified cyber-attack data 280). Similarly, evaluator 206 may measure an effectiveness of cyber defense simulation 228 against cyber-attack simulation 226. Evaluator 206 may recommend modifications in cyber defense simulation 228 (e.g., modified cyber defense data 286). Accordingly, information for mitigating the impact or effects from cyber-attack simulation 226 on aircraft simulation 248 and/or pilot 102 may be obtained.

Cyber-attack metrics 202 may be used, for example, by cyber-attack generator 268 as modified cyber-attack data 280, to recommend or generate modified cyber-attack simulation 282 designed to be effective against cyber defense simulation 228. As one non-limiting example, cyber-attack metrics 202 and/or modified cyber-attack data 280 may be used as the basis for designing modified cyber-attack simulation 282 to attack a particular (e.g., identified) vulnerable aircraft system simulation 250 and/or aircraft component simulation 252. As another non-limiting example, cyber-attack metrics 202 and/or modified cyber-attack data 280 may be used as the basis for designing modified attack vector simulation 284 to take a particular path, for example, to penetrate cyber defense simulation 228 or pivot at a newly vulnerable aircraft system simulation 250 and/or aircraft component simulation 252.

Cyber defense metrics 200 may be used, for example, by cyber defense generator 274 as modified cyber defense data 286, to recommend or generate modified cyber defense simulation 288 designed to be effective against cyber-attack simulation 226. As one non-limiting example, cyber defense metrics 200 and/or modified cyber defense data 286 may be used as the basis for designing modified cyber defense simulation 288 to detect and/or block cyber-attack simulation 226. As another non-limiting example, cyber defense metrics 200 and/or modified cyber defense data 286 may be used as the basis for modifying aircraft system simulation 250 and/or aircraft component simulation 252. For instance, cyber defense metrics 200 and/or modified cyber defense data 286 may be used for implementing design changes to the aircraft 138, such as, modifying and/or changing one or more systems 140 and/or components 114. As another non-limiting example, cyber defense metrics 200 and/or modified cyber defense data 286 may be used as the basis for implementing cybersecurity software in connection with a vulnerable aircraft system simulation 250 and/or aircraft component simulation 252. As yet another example, cyber defense metrics 200 and/or modified cyber defense data 286 may be used as the basis for modifying pilot reaction (e.g., through pilot training) to cyber-attack simulation 226. For instance, cyber defense metrics 200 and/or modified cyber defense data 286 may be used to generate and/or create pilot training modules for training pilot 102 on suitable ways to react to various cyber-attacks and/or the effects of cyber-attacks on various systems and/or components of the aircraft in order to mitigate the adverse impact from the cyber-attack.

Cyber-attack analysis tool 136 (e.g., evaluator 206) may also use pilot biographical data 198 as input data for assessment and evaluation of cyber-attack scenario 174. Pilot biographical data 198 may include attributes of pilot 102. For example, pilot biographical data 198 may include, but is not limited to, the age of the pilot, the years of experience of the pilot, demographic information about the pilot (e.g., flight routes taken by the pilot), or any other suitable pilot data. For example, pilot biographical data 198 may be used when evaluating cyber defense simulation 228 to identify how pilots having certain biographical data react to various cyber-attack simulations 226. Pilot biographical data 198 may be stored in database 116 (FIG. 3).

The embodiments described herein may include or be implemented on computer system 106. Computer system 106 may include one or more computers 160. When more than one computer 160 is present in computer system 106, computers 160 may be in communication with each other over a communications medium (e.g., using wired and/or wireless communications links or computer network).

Computer system 106 may be configured to function in accordance with a computer-readable code provided to computer system 106 by way of computer-readable storage media. While not depicted in FIG. 2, those skilled in the computing and control arts will appreciate that such computer-readable storage media may include, but is not limited to, solid-state memory, optical storage media, magnetic storage media, etc. Other suitable forms of computer-readable storage media may also be used in accordance with the particular embodiment of computer system 106. In any case, one or more of the features of cyber-attack simulation environment 100 (e.g., cyber-attack generator 268, cyber defense generator 274, cyber-attack scenario generator 244, aircraft simulator 246, flight simulator 104, cyber-attack analysis tool 136, scenario generator 222, simulation tool 220 and/or evaluation tool 238) may be implemented, at least in part, by executable program code (e.g., a computer program product) provided to computer system 106, and executable by a data processing system or processor unit, by way of suitable computer-readable storage media.

As one example, computer system 106 may be located in a remote location from cyber-attack scenario simulation system 148. Computer system 106 may communicate with cyber-attack scenario simulation system 148 (e.g., cyber-attack generator 268, cyber defense generator 274, cyber-attack scenario generator 244, aircraft simulator 246, flight simulator 104, cyber-attack analysis tool 136, scenario generator 222 (FIG. 6), simulation tool 220 (FIG. 6) and/or evaluation tool 238 (FIG. 6)) over a communications medium (e.g., computer network 166). As another example, computer system 106 may be part of cyber-attack scenario simulation system 148, for example, cyber-attack generator 268, cyber defense generator 274, cyber-attack scenario generator 244, aircraft simulator 246 and/or flight simulator 104 may have a dedicated computer 160.

The illustrated embodiment of cyber-attack scenario simulation environment 100 in FIG. 2 is not meant to imply physical or architectural limitations to the manner in which different example embodiments may be implemented. Other features in addition to and/or in place of the ones illustrated may be used. Some features may be unnecessary in some example embodiments. Also, the blocks are presented to illustrate some functional features. One or more of these blocks may be combined and/or divided into different blocks when implemented in different example embodiments.

While example embodiments of aircraft simulator 246 and/or flight simulator 104 may be described in terms of constructive or virtual representations of a physical aircraft and/or systems and components of the physical aircraft, those skilled in the art will recognize that aircraft simulator 246 and/or flight simulator 104 may also take the form of a physical aircraft and/or physical systems and/or components thereof.

In order to develop unique cyber-attack simulations for different cyber-attack scenarios (e.g., cyber attacks having unique attack vectors), it may be advantageous to isolate certain individual systems and/or components of the aircraft, group together certain systems and/or components of the aircraft, exchange certain systems and/or components of the aircraft or initiate the cyber attack on certain targeted systems and/or components of the aircraft during a simulated cyber-attack scenario.

Figure 5:
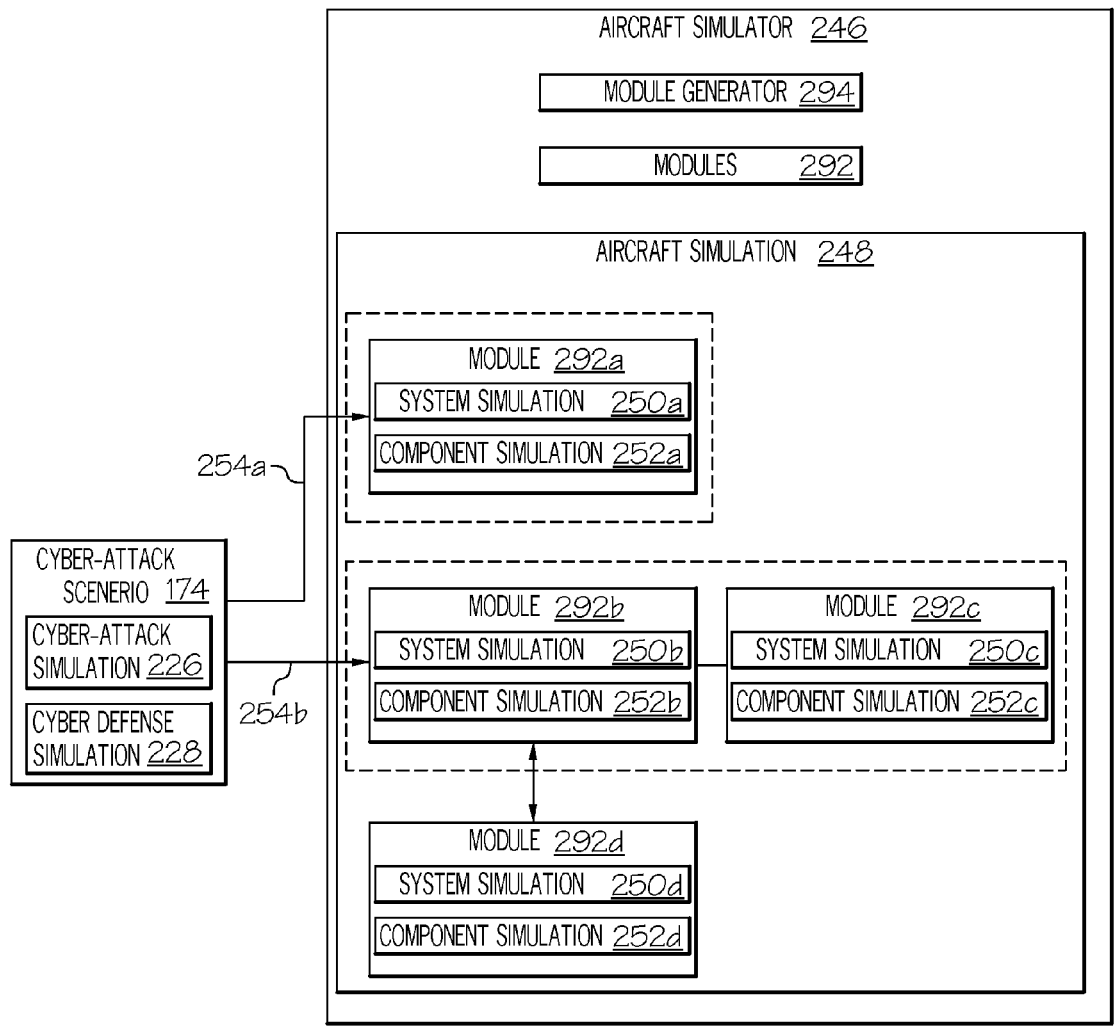
FIG. 5 is a block diagram of one embodiment of the aircraft simulator of FIG. 2.

FIG. 5 illustrates one embodiment of aircraft simulator 246. Aircraft simulator 246 may be configured to represent (e.g., include) a partial virtualized attack environment or aircraft simulation 248 (e.g., aircraft simulation 248 may not be a complete simulation of the aircraft or all the integrated aircraft systems and/or components). Accordingly, artificial re-creations or representations of one or more individual aircraft systems 140 and/or aircraft components 114 (FIG. 1) may be isolated, grouped together, exchanged with one another and/or specifically targeted by cyber-attack simulation 226.

Referring still to FIG. 5, in one example, aircraft simulator 246 may include a plurality of modules 292. Each module 292 (identified individually as module 292a, module 292b, module 292c and module 292d) may include hardware, software or a combination thereof. For example, modules 292 may be implemented in software, in hardware, in special purpose digital logic, and/or any combination thereof.

Each module 292 may be configured to (e.g., operable to) artificially re-create a particular aircraft system 140 or aircraft component 114. As one example, module 292a may represent system simulation 250a (e.g., a virtual aircraft system) or component simulation 252a (e.g., a virtual aircraft component). As another example, module 292b may represent a different system simulation 250b or a different component simulation 252b. As another example, module 292c may represent a different system simulation 250c or component simulation 252c. As yet another example, module 292d may represent a different system simulation 250d or component simulation 252d.

In one example implementation, cyber-attack scenario 174 may be launched against and set to run on a particular module 292 in isolation (e.g., module 292a). Evaluation of cyber-attack scenario 174 (e.g., the effectiveness of cyber-attack simulation 226 by way of attack vector simulation 254a on module 292a and the effectiveness of cyber defense simulation 228 to protect module 292a) may be performed based on the effect or impact of cyber-attack scenario 174 on that particular module 292a. For example, simulated aircraft response data 194 (e.g., simulated system response data 262 and/or simulated component response data 264) may be limited to response data associated with the particular system simulation or component simulation corresponding to module 292a.

In another example implementation, cyber-attack scenario 174 may be launched against and set to run on a cooperating (e.g., communicating) group of modules 292 (e.g., module 292b and module 292c). Evaluation of cyber-attack scenario 174 (e.g., the effectiveness of cyber-attack simulation 226 by way of attack vector simulation 254b on module 292b and module 292c and the effectiveness of cyber defense simulation 228 to protect module 292b and module 292c) may be performed based on the effect or impact of cyber-attack scenario 174 on that particular grouping of module 292b and module 292c. For example, simulated aircraft response data 194 (e.g., simulated system response data 262 and/or simulated component response data 264) may be limited to response data associated with the particular system simulation or component simulation corresponding to module 292b and module 292c.

Isolating a grouping of module 292b and 292c may allow for identification and/or evaluation of new vulnerabilities in a particular system or component (e.g., system simulation 250b or component simulation 252b represented by module 292b) in response to cyber-attack simulation 226, which may lead to exploitation of a previously secure system or component (e.g., system simulation 250c or component simulation 252c represented by module 292c).

Exchanging module 292b with module 292d may allow for new design implementations of a particular system or component (e.g., by using system simulation 250d or component simulation 252d), which may be better suited to respond to cyber-attack simulation 226.

Figure 6:
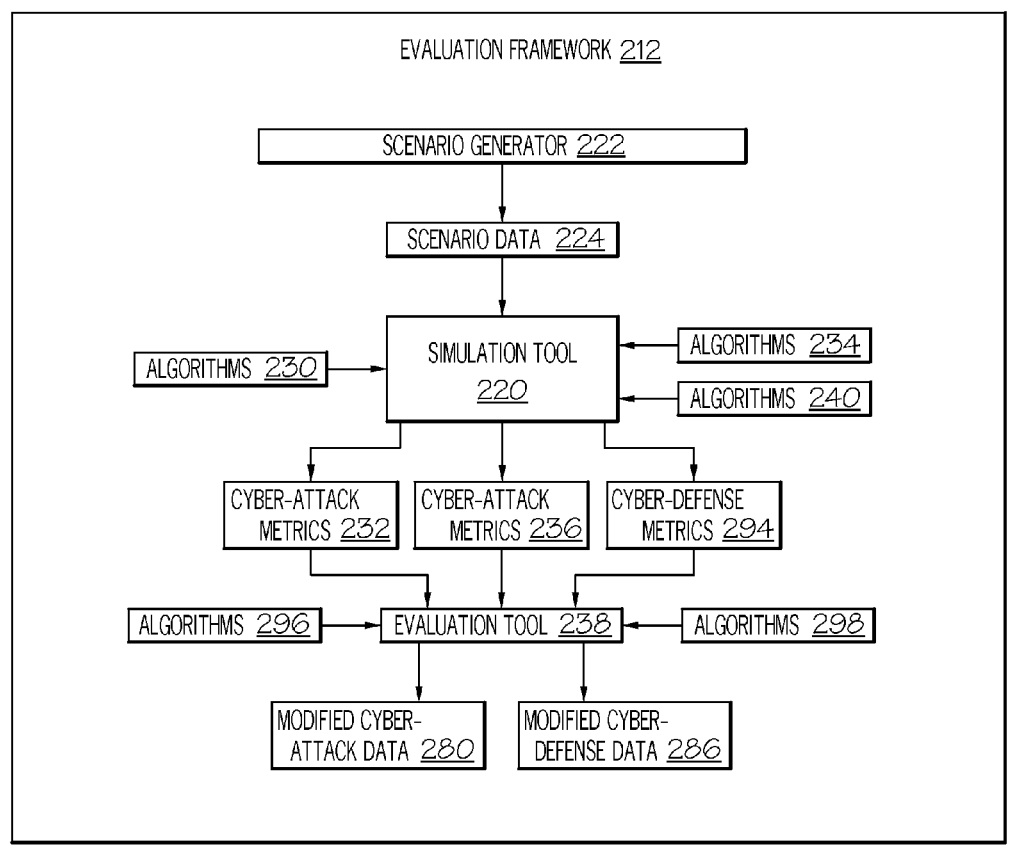
FIG. 6 is a block diagram of one embodiment of an evaluation framework.

FIG. 6 illustrates one example embodiment of evaluation framework 212 that may be used to evaluate cyber-attack scenario 174. Evaluation framework 212 may model cyber-attack simulation 226 (e.g., having a particular attack vector simulation 254) launched against aircraft simulation 248 (e.g., targeting a particular aircraft system simulation 250 and/or aircraft component simulation 252) and evaluate the effectiveness of cyber defense simulation 228 against cyber-attack simulation 226. Thus, evaluation framework 212 may simulate cyber-attack 214 on aircraft 138 (e.g., targeting a particular aircraft system 140 and/or aircraft component 114) (FIG. 1).

Evaluation framework 212 may include simulation tool 220 that receives scenario data 224 (e.g., information) from scenario generator 222. With reference to FIGS. 2, 3 and 6, scenario data 224 may include, but is not limited to, cyber-attack scenario 174, aircraft simulation data (e.g., system simulation data 256 and/or component simulation data 258, flight data 120, physical condition data 132, simulated aircraft response data 194 (e.g., simulated system response data 262 and/or simulated component response data 264)), simulated flight data 182, sensor data 180 (e.g., pilot response data 196) and any other suitable data useful for simulating a cyber-attack on the aircraft. Thus, in one embodiment, scenario generator 222 and simulation tool 220 may be an integration of cyber-attack scenario generator 244, aircraft simulator 246, flight simulator 104 and/or sensor system 178.

Simulation tool 220 may also receive or utilize one or more algorithms 230 for determining cyber-attack metrics 232 that describe the effect of cyber-attack simulation 226 on aircraft simulation 248 (e.g., on one or more aircraft system simulations 250 and/or aircraft component simulations 252) without implementation of cyber defense simulation 228. As one example, cyber-attack metrics 232 may be used as base metrics to evaluate the effectiveness of cyber-attack simulation 226. Cyber-attack metrics 232 may be an example of cyber-attack metrics 202 (FIG. 2).

Simulation tool 220 may also receive or utilize one or more algorithms 234 for determining cyber-attack metrics 236 that describe the effect of cyber-attack simulation 226 on aircraft simulation 248 (e.g., on one or more aircraft system simulations 250 and/or aircraft component simulations 252) with implementation of cyber defense 228. Cyber-attack metrics 236 may be another example of cyber-attack metrics 202 (FIG. 2).

Simulation tool 220 may also receive or utilize one or more algorithms 240 determining cyber defense metrics 294 that describe the effectiveness of cyber defense simulation 228 against cyber-attack simulation 226. Cyber defense metrics 294 may be an example of cyber defense metrics 200 (FIG. 2).

Evaluation framework 212 may include evaluation tool 238 that receives cyber-attack metrics 232, cyber-attack metrics 236 and cyber defense metrics 294 from simulation tool 220. Evaluation tool 238 may receive or utilize algorithms 296 for evaluating the effectiveness of cyber-attack simulation 226 against cyber defense simulation 228 and/or aircraft simulation 248. Evaluation tool 238 may receive or utilize algorithms 298 for evaluating the effectiveness of cyber defense simulation 228 against cyber-attack simulation 226. Evaluation tool 238 may further generate recommendations for modified cyber-attack simulations 282 (e.g., modified cyber-attack data 280) and/or modified cyber defense simulations 288 (e.g., modified cyber defense data 286).

The example evaluation process illustrated by evaluation framework 212 may be repeated based on modified cyber-attack scenario 278.

The illustrated embodiment of evaluation framework in FIG. 6 is not meant to imply physical or architectural limitations to the manner in which different example embodiments may be implemented. Other features in addition to and/or in place of the ones illustrated may be used. Some features may be unnecessary in some example embodiments. Also, the blocks are presented to illustrate some functional features. One or more of these blocks may be combined and/or divided into different blocks when implemented in different example embodiments.

Figure 7:
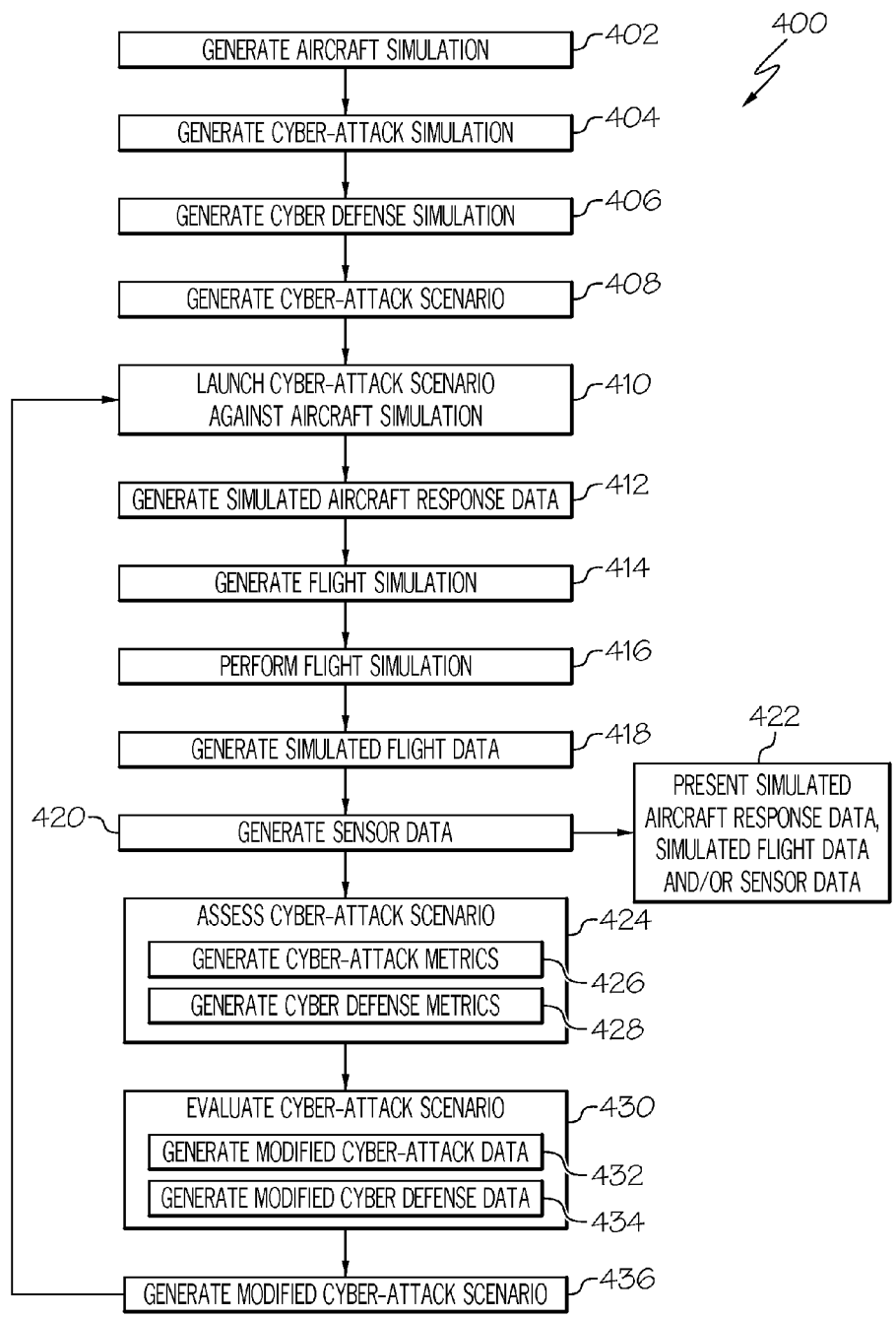
FIG. 7 is a flow diagram of one embodiment of the disclosed method for developing a cyber-attack scenario simulation.

FIG. 7 illustrates one embodiment of method, generally designated 400, for developing a cyber-attack scenario simulation of an aircraft.

Referring to FIG. 7, and with reference to FIGS. 1, 2, 5 and 6, method 400 may begin with the step of generating aircraft simulation 248, as shown at block 402. As one example, aircraft simulation 248 may include one or more aircraft system simulations 250 and/or one or more aircraft component simulations 252. As another example, aircraft simulation 248 may include a plurality of modules 292 representing one or more aircraft system simulations 250 and/or one or more aircraft component simulations 252. In one example implementation, aircraft simulation 248 may be generated by aircraft simulator 246 from input data 260.

As shown at block 404, method 400 may further include the step of generating cyber-attack simulation 226. Cyber-attack simulation 226 may be generated from cyber-attack data 270. As shown at block 406, method 400 may further include the step of generating cyber defense simulation 228. Cyber defense simulation 228 may be generated from cyber defense data 276.

As shown at block 408, method 400 may further include the steps of generating cyber-attack scenario 174. Cyber-attack scenario 174 may include cyber-attack simulation 226 and cyber defense simulation 228. As shown at block 410, cyber-attack scenario 174 may be launched against aircraft simulation 248 (e.g., targeting and set to run on one or more aircraft system simulations 250 and/or one or more aircraft component simulations 252).

As shown at block 412, method 400 may further include the step of generating simulated aircraft response data 194 in response to cyber-attack scenario 174 being launched against aircraft simulation 248 (block 408). Aircraft response data 194 may include simulated system response data 262 and/or simulated component response data 264. Simulated aircraft response data 194 may be generated throughout flight simulation 108 and/or throughout cyber-attack scenario 174 simulation.

As shown at block 414, method 400 may further include the step of generating flight simulation 108. Flight simulation 108 may be generated by flight simulator 104 from input data 260 and/or simulated aircraft response data 194.

As shown at block 416, method 400 may further include the step of performing, by pilot 102, flight simulation 108. Flight simulation 108 may provide a virtual realization of the effect of cyber-attack scenario 174 on aircraft simulation 248. Pilot 102 may interact with flight simulation 108 through pilot interface 152 and display 154. Information 158 representing a virtual implementation of flight and instrument displays of the aircraft during flight simulation 108 may be displayed to pilot 102. For example, the effect of cyber-attack scenario 174 (e.g., cyber-attack simulation 226 on aircraft system simulations 250 and/or aircraft component simulation 252) may be represented through display 154. For instance, various virtual implementations of instrument displays may malfunction, show false readings or the like.

In one example implementation, launch of cyber-attack scenario 174 (e.g., initiation of cyber-attack simulation 226 and cyber defense simulation 228) may occur at a particular flight phase (e.g., selected by operator 162, cyber-attack team 266 or cyber defense team 272) or at specific time during flight simulation 108. In another example implementation, launch of cyber-attack scenario 174 may occur randomly throughout flight simulation 108. In another example implementation, a specific cyber-attack scenario 174 (e.g., defined by a designed cyber-attack simulation 226 and/or designed cyber defense simulation 228) may be selected to target a particular aircraft system simulation 250 and/or aircraft component simulation 252. In yet another example implementation, cyber-attack scenario 174 may include multiple cyber-attack simulations 226 selected to randomly target aircraft system simulations 250 and/or aircraft component simulations 252.

As shown at block 418, method 400 may further include the step of generating simulated flight data 182. Simulated flight data 182 may be generated by flight simulator 104 and include data representing flight parameters of aircraft simulation 248 in response to the effects from cyber-attack scenario 174 on aircraft system simulations 250 and/or aircraft component simulations 252 and/or due to the reaction of pilot 102. Simulated flight data 182 may be generated throughout flight simulation 108 and/or throughout cyber-attack scenario 174 simulation.

As shown at block 420, method 400 may further include the step of generating sensor data 180. Sensor data 180 may include pilot response data 196 representing the reaction and/or physical response of pilot 102 from cyber-attack scenario 174 on aircraft system simulations 250 and/or aircraft component simulations 252, which may affect flight of the aircraft (and which may also be represented in simulated flight data 182). Sensor data 180 may be generated by sensor system 178. Sensor data 180 may be generated throughout flight simulation 108 and/or throughout cyber-attack scenario 174 simulation.

For example, sensors 130 may be positioned proximate to (e.g., at or near) or within flight simulator 104 to track pilot gaze relative to display 154. As one example, sensors 130 may determine the location and/or duration of pilot gaze during normal operation of the aircraft while performing flight simulation 108. As another example, sensors 130 may determine the location and/or duration of pilot gaze during and/or following launch of cyber-attack scenario 174.

As shown at block 422, method 400 may further include the step of presenting simulated aircraft response data 194, simulated flight data 182 and/or sensor data 180. For example, simulated aircraft response data 194, simulated flight data 182 and/or sensor data 180 may be presented to operator 162, cyber-attack team 266 and/or cyber defense team 272 (e.g., on display 176) for analysis and/or evaluation of cyber-attack scenario 174. As one specific, non-limiting example, sensor data 180 may be presented graphically in the form a heat map representing pilot gaze relative to display 154.

As shown at block 424, method 400 may further include the step of assessing the impact of cyber-attack scenario 174 on aircraft simulation 248. As one example, assessing cyber-attack scenario 174 may include generating cyber-attack metrics 202 for cyber-attack simulation 226, as shown at block 426. Generating cyber-attack metrics 202 may include quantifying the impact on aircraft simulation 248, aircraft system simulations 250 and/or aircraft component simulations 252 and/or quantifying the impact on aircraft simulation 248 and/or pilot 102 in response to cyber-attack simulation 226.

As another example, assessing cyber-attack scenario 174 may include generating cyber defense metrics 200 for cyber defense simulation 228, as shown at block 428. Generating cyber defense metrics 200 may include quantifying the effectiveness of cyber defense simulation 228 as a countermeasure to cyber-attack simulation 226.

As shown at block 430, method 400 may further include the step of evaluating cyber-attack scenario 174. Evaluating cyber-attack scenario 174 may include generating modified cyber-attack data 280, as shown at block 432. Modified cyber-attack data 280 may be used to generate a more effective modified cyber-attack simulation 282. Evaluating cyber-attack scenario 174 may include generating modified cyber defense data 286, as shown at block 434. Modified cyber defense data 286 may be used to generate a more effective modified cyber defense simulation 288.

Evaluating cyber-attack scenario 174 may also include generating pilot training modules, modifying the design of the systems and/or components or any other action designed to mitigate the effects of a successful cyber-attack on the aircraft and/or the pilot.

As shown at block 436, method 400 may further include the step of generating modified cyber-attack scenario 278. Modified cyber-attack scenario 278 may include modified cyber-attack simulation 282 and/or modified cyber defense simulation 288.

The steps of method 400 may be repeated to assess and/or evaluate modified cyber-attack scenario 278. For example, modified cyber-attack scenario 278 may be assessed as described above (e.g., the impact of modified cyber-attack scenario 278 on aircraft simulation 248 and the pilot response). Evaluating modified cyber-attack scenario 278 may include comparing the assessed cyber-attack scenario 174 and the assessed modified cyber-attack scenario 278.

Modifications, additions, or omissions may be made to the methods disclosed herein without departing from the scope of the present disclosure. The methods may include more, fewer, or other steps. Additionally, steps may be performed in any suitable order.

Figure 8:
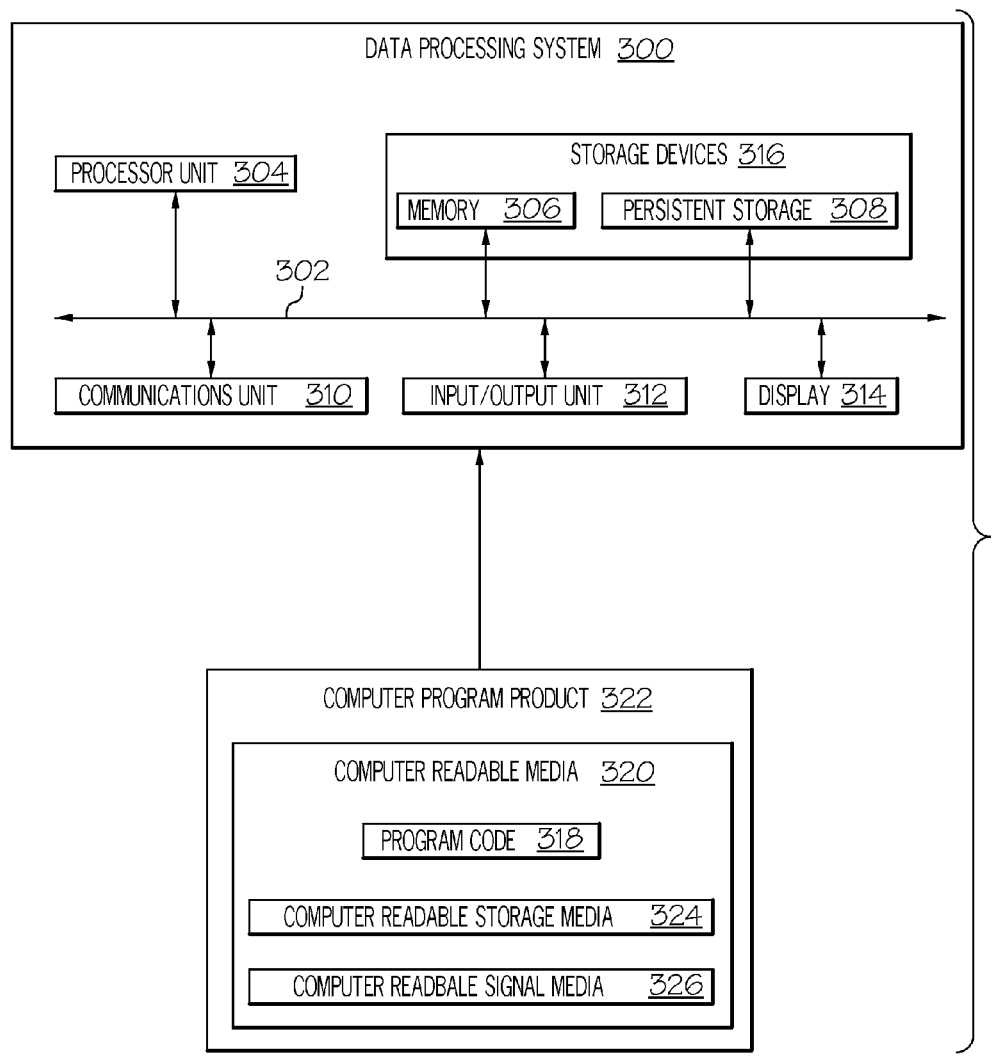
FIG. 8 is block diagram of one embodiment of a data processing system.

FIG. 8 illustrates one embodiment of data processing system 300. Data processing system 300 may be an example of a data processing system used to implement computers 160 of computer system 106 (FIG. 2). Data processing system 300 may include communications bus 302, which provides communications between processor unit 304, memory 306, persistent storage 308, communications unit 310, input/output ("I/O") unit 312, and display 314.

Communications bus 302 may include one or more buses, such as a system bus or an input/output bus. Communications bus 302 may be implemented using any suitable type of architecture that provides for a transfer of data between different components or devices attached to the bus system.

Processor unit 304 may serve to execute instructions for software that may be loaded into memory 306. Processor unit 304 may be one or more processors or may be a multi-processor core, depending on the particular implementation. As one example, processor unit 304 may be implemented using one or more heterogeneous processor systems, in which a main processor is present with secondary processors on a single chip. As another example, processor unit 304 may be a symmetric multi-processor system containing multiple processors of the same type.

Memory 306 and persistent storage 308 may be examples of storage devices 316. Storage device 316 may be any piece of hardware that is capable of storing information including, but not limited to, data, program code in functional form, and/or other suitable information either on a temporary basis and/or a permanent basis. For example, memory 306 may be a random access memory or any other suitable volatile or non-volatile storage device.

Persistent storage 308 may take various forms, depending on the particular implementation. Persistent storage 308 may contain one or more components or devices. For example, persistent storage 308 may be a hard drive, a flash memory, a rewritable optical disk, a rewritable magnetic tape, or some combination thereof. The media used by persistent storage 308 may be removable. For example, a removable hard drive may be used for persistent storage 308.

Communications unit 310 may provide for communication with other data processing systems or devices. For example, communications unit 310 may communicate with pilot interface 152, database 116, and/or other computers or networks (FIG. 2). As one example, communications unit 310 may include a network interface card. As another example, communications unit 310 may include one or more devices used to transmit and receive data, such as a modem or a network adapter. Communications unit 310 may provide communications through the use of wired and/or wireless communications links.

Input/output unit 312 may allow for the input and output of data with other devices connected to data processing system 300. For example, input/output unit 312 may provide a connection for input (e.g., pilot input 156, operator input 168 and/or input from cyber-attack team 266 and/or cyber defense team 272) (FIG. 2) through a keyboard, a mouse, and/or some other suitable input device. Further, input/output unit 312 may send output to a printer and/or display 314. Display 314 may be an example of display 154 and/or display 176 and may provide a mechanism to display information to pilot 102, operator 162, cyber-attack team 266 and/or cyber defense team 272.

Instructions for the operating system, applications, and/or programs may be located in storage devices 316, which are in communication with processor unit 304 through communications bus 302. As one example, the instructions are in a functional form on persistent storage 308. The instructions may be loaded into memory 306 for execution by processor unit 304. The processes of the different embodiments may be performed by processor unit 304 using computer implemented instructions, which may be located in a memory, such as memory 306.

The instructions may be referred to as program code, computer usable program code, or computer readable program code that may be read and executed by a processor in processor unit 304. The program code, in the different embodiments, may be embodied on different physical or computer readable storage media, such as memory 306 or persistent storage 308.

Program code 318 may be located in a functional form on the computer readable media 320 that is selectively removable and may be loaded onto or transferred to data processing system 300 for execution by processor unit 304. Program code 318 and computer readable media 320 may form computer program product 322. In one example, computer readable media 320 may be computer readable storage media 324 or computer readable signal media 326.

Computer readable storage media 324 may include, but is not limited to, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory that is connected to data processing system 300. In some instances, computer readable storage media 324 may not be removable from data processing system 300.

Alternatively, program code 318 may be transferred to data processing system 300 using computer readable signal media 326. For example, computer readable signal media 326 may be a propagated data signal containing program code 318. Computer readable signal media 326 may include, but is not limited to, an electromagnetic signal, an optical signal, and/or any other suitable type of signal. These signals may be transmitted over communications links, such as wireless communications links, a wire, an optical fiber cable, a coaxial cable, and/or any other suitable type of communications link.

In one example embodiment, program code 318 may be downloaded (e.g., over network 166) to persistent storage 308 from another device or data processing system through computer readable signal media 326 for use within data processing system 300. For example, program code stored in computer readable storage media in a server data processing system may be downloaded over a network from the server to data processing system 300. The data processing system providing program code 318 may be a server computer, a client computer, or some other device capable of storing and transmitting program code 318.

The illustrated embodiment of data processing system 300 in FIG. 8 is not meant to provide physical or architectural limitations to the manner in which different embodiments may be implemented. Other components in addition to and/or in place of the ones illustrated may be used. Some components may be unnecessary in some example embodiments. Also, the blocks are presented to illustrate some functional components. One or more of these blocks may be combined and/or divided into different blocks when implemented in different example embodiments.

Thus, embodiments of the present disclosure may provide techniques for developing a simulated cyber-attack on an aircraft during various flight phases, evaluating an impact of the cyber-attack on the aircraft (e.g., systems and/or components of the aircraft) and/or the pilot, and developing a simulated cyber defense as ac countermeasure to the simulated cyber-attack for mitigating the impact of the simulated cyber-attack on the aircraft and/or the pilot.

Figure 9:
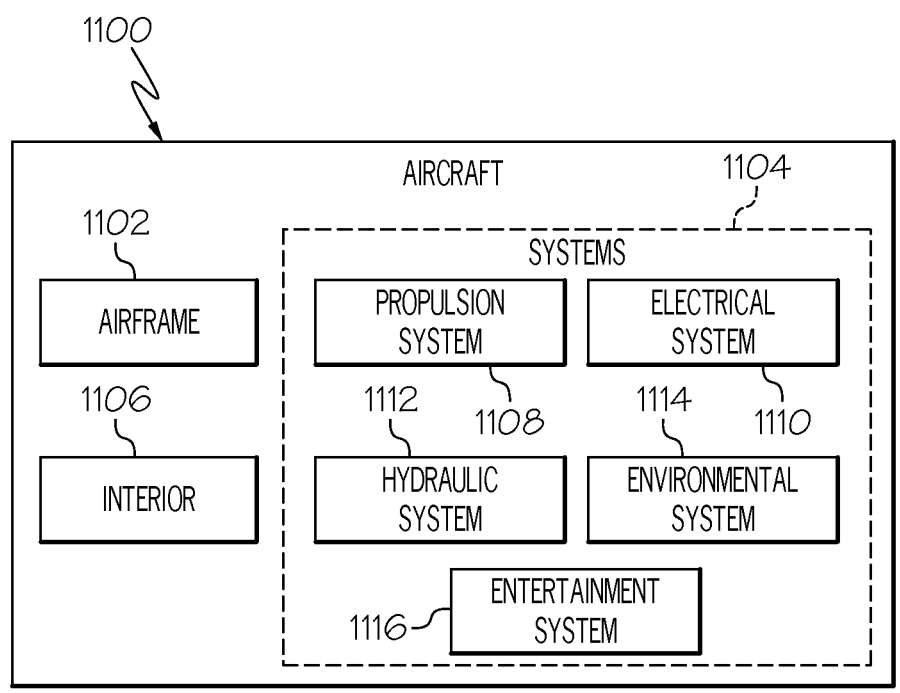
FIG. 9 is a block diagram of one embodiment of an aircraft.

Referring to FIG. 9, apparatus and methods embodied herein may be employed during at least one of the stages of aircraft manufacturing and service and/or during at least one of the stages of pilot training. For example, one or more illustrative embodiments may be implemented during system integration of new or modified components. The different illustrative examples may be implemented to perform a simulation of systems 1104 of aircraft 1100. In particular, the simulation of aircraft 1100 may be used to evaluate and mitigate cyber-attack threats to components of systems 1104.

For example, information about a cyber-attack threat to aircraft 1100 and a responsive reaction to the pilot may be defined by modifying characteristics of components of systems 1104. As another example, an impact on aircraft 1100 and/or the pilot from a cyber-attack may be identified in concurrent displays of real time views and/or recordings of simulations of systems 1104. In this example, the different real time views and/or recordings may each show an effect of the cyber defense, an impact of the cyber-attack on aircraft 1100 and a response from the pilot based on simulations of components of systems 1104 of aircraft 1100.

Aircraft 1100 may include airframe 1102 with a plurality of high-level systems 1104 and interior 1106. Examples of high-level systems 1104 may include one or more of propulsion system 1108, electrical system 1110, hydraulic system 1112, environmental system 1114, and entertainment system 1116. Any number of other systems may be included. Although an aerospace example is shown, the principles disclosed herein may be applied to other industries, such as the automotive and marine industries. Accordingly, in addition to the aircraft 1100, the principles disclosed herein may apply to other vehicles (e.g., land vehicles, marine vehicles, space vehicles, etc.).

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

The operations of the embodiments may be performed by one or more computer readable media encoded with a computer program, software, computer executable instructions, and/or instructions capable of being executed by a computer. The operations of the embodiments may be performed by one or more computer readable media storing, embodied with, and/or encoded with a computer program and/or having a stored and/or an encoded computer program.

A memory stores information. A memory may include one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Accordingly, in one example, the systems and methods described herein may be used to predict potential and/or currently unknown (e.g., new) cyber-attacks on the aircraft or the systems and/or components of the aircraft. In another example, the systems and methods described herein may be used to predict potential and/or currently unknown (e.g., new) attack vectors of known (e.g., currently existing) cyber-attacks on the aircraft or the systems and/or components of the aircraft. In another example, the systems and methods described herein may be used to develop cyber defenses intended to prevent the cyber-attack (e.g., a known cyber-attack or an unknown cyber-attack) from affecting the aircraft or the systems and/or components of the aircraft. In another example, the systems and methods described herein may be used to develop cyber defenses intended to mitigate any negative impact of the cyber-attack (e.g., a known cyber-attack or an unknown cyber-attack) on the aircraft, the systems and/or components of the aircraft, and/or the pilot of the aircraft. In another example, the systems and methods described herein may be used to develop other mitigation actions (e.g., training programs, aircraft modifications, etc.) intended to mitigate any negative impact of the cyber-attack (e.g., a known cyber-attack or an unknown cyber-attack) on the aircraft, the systems and/or components of the aircraft, and/or the pilot of the aircraft. In another example, the systems and methods described herein may be used to develop cyber defenses intended to block known or currently unknown attack vectors of the cyber-attack. In another example, the systems and methods described herein may be used to analyze the effectiveness of the cyber defense against known or currently unknown cyber-attacks and/or attack vectors of the cyber-attack. In another example, the systems and methods described herein may be used to identify one or more potential vulnerabilities in the aircraft, the systems and/or components of the aircraft, and/or the pilot of the aircraft. In another example, the systems and methods described herein may be used to develop new cyber-attacks and/or attack vectors that exploit the identified vulnerabilities in the aircraft, the systems and/or components of the aircraft, and/or the pilot of the aircraft Although various embodiments of the disclosed system and method have been shown and described, modifications may occur to those skilled in the art upon reading the specification. The present application includes such modifications and is limited only by the scope of the claims.

What is claimed is:

1. A cyber-attack scenario simulation system comprising:
   a hardware processor;
   an aircraft simulator operable to generate an aircraft simulation, said aircraft simulation comprising a plurality of modules, wherein said aircraft simulator is operable to isolate one module from another module;
   a cyber-attack generator operable to generate a cyber-attack simulation;
   a cyber defense generator operable to generate a cyber defense simulation;
   a scenario generator operable to generate a cyber-attack scenario comprising said cyber attack simulation and said cyber defense simulation and launch said cyber-attack scenario against said aircraft simulation;
   a flight simulator operable to generate a flight simulation based on said aircraft simulation and said cyber-attack scenario;
   a display to display said flight simulation to a pilot interfacing with said flight simulator;
   a cyber-attack scenario analysis tool operable to assess an impact of said cyber-attack scenario on said aircraft simulation as a whole and on isolated ones of said plurality of modules; and
   a sensor system configured to determine a reaction of said pilot while interfacing with said flight simulator following launch of said cyber-attack scenario, and wherein said cyber-attack scenario analysis tool is further operable to assess a pilot response.

2. The system of claim 1 wherein each module represents one of a system simulation or a component simulation.

3. The system of claim 1 wherein said aircraft simulator is further operable to isolate a set of modules from any other module, and wherein a cyber-attack scenario analysis tool is further operable to assess said impact of said cyber-attack scenario on said set of modules.

4. The system of claim 1 wherein said aircraft simulator is further operable to exchange at least one module with a different module, and wherein a cyber-attack scenario analysis tool is further operable to assess said impact of said cyber-attack scenario on said aircraft simulation as a whole and said different module.

5. The system of claim 1 wherein said cyber-attack scenario analysis tool is further operable to identify vulnerabilities in at least one of said plurality of modules.

6. The system of claim 5 wherein:
   said cyber-attack generator is further operable to generate a modified cyber-attack simulation in response to identified vulnerabilities in at least one of said plurality of modules,
   said cyber defense generator is further operable to generate a modified cyber defense simulation in response to said modified cyber-attack simulation, and
   said cyber-attack scenario is repeatable.

7. The system of claim 1 wherein:
   said cyber-attack generator is further operable to generate a modified cyber-attack simulation in response to identified vulnerabilities in said pilot response,
   said cyber defense generator is further operable to generate a modified cyber defense simulation in response to said modified cyber-attack simulation, and
   said cyber-attack scenario is repeatable.

8. The system of claim 1 wherein said cyber-attack simulation comprises an attack vector simulation.

9. A computer implemented method using a hardware processor for developing a cyber-attack scenario simulation, said method comprising:
   generating, by said hardware processor, an aircraft simulation comprising a plurality of modules, wherein at least one module is capable of being isolated from at least another module;
   generating a cyber-attack simulation;
   generating a cyber defense simulation;
   generating a cyber-attack scenario comprising said cyber-attack simulation and said cyber defense simulation;
   launching said cyber-attack scenario against said aircraft simulation;
   generating a flight simulation based on said aircraft simulation and said cyber-attack scenario;
   displaying said flight simulation to a pilot interfacing with a flight simulator;
   assessing an impact of said cyber-attack scenario on said aircraft simulation as a whole and on isolated ones of said plurality of modules;
   generating sensor data representing a pilot response while said pilot is interfacing with said flight simulator following launch of said cyber-attack scenario; and
   assessing an impact of said cyber-attack scenario on said pilot response.

10. The method of claim 9 wherein each module represents one of an aircraft system simulation or an aircraft component simulation.

11. The method of claim 9 further comprising:
    exchanging at least one module with a different module; and
    assessing an impact of said cyber-attack scenario on said aircraft simulation as a whole and said different module.

12. The method of claim 9 further comprising identifying a vulnerability in said aircraft simulation, wherein said vulnerability is exploitable by said cyber-attack simulation.

13. The method of claim 9 further comprising:
    generating a modified cyber-attack simulation;
    generating a modified cyber defense simulation;

generating a modified cyber-attack scenario comprising said modified cyber-attack simulation and said modified cyber defense simulation;

launching said modified cyber-attack scenario against said aircraft simulation;

assessing an impact of said modified cyber-attack scenario on said aircraft simulation as a whole and on said isolated ones of said plurality of modules; and evaluating an assessed modified cyber-attack scenario compared to an assessed cyber-attack scenario.

14. The method of claim 9 further comprising assessing an impact of said pilot response on said aircraft simulation.

15. The method of claim 9 wherein said cyber-attack simulation comprises an attack vector simulation.

16. A computer program product for developing a cyber-attack scenario simulation, said computer program product comprising:

a non-transitory computer readable medium; and program code, stored on said non-transitory computer readable medium, for:

generating an aircraft simulation comprising a plurality of modules, wherein each module represents one of a system simulation or a component simulation, and wherein at least one module is capable of being isolated from at least another module;

generating a cyber-attack simulation;

generating a cyber defense simulation;

generating a cyber-attack scenario comprising said cyber-attack simulation and said cyber defense simulation;

launching said cyber-attack scenario against said aircraft simulation;

generating a flight simulation based on said aircraft simulation and said cyber-attack scenario for display to a pilot interfacing with a flight simulator;

assessing an impact of said cyber-attack scenario on said aircraft simulation as a whole and on isolated ones of said plurality of modules;

processing pilot response data representing a pilot response while said pilot is interfacing with said flight simulator following launch of said cyber-attack scenario; and assessing an impact of said cyber-attack scenario on said pilot response.

17. The computer program product of claim 16 wherein a set of modules is capable of being isolated from any other module; and comprising further program code, stored on said non-transitory computer readable medium, for:

assessing an impact of said cyber-attack scenario on said aircraft simulation as a whole and on said set of modules.

18. The computer program product of claim 16 wherein at least one module is capable of being exchanged with a different module; and comprising further program code, stored on said non-transitory computer readable medium, for:

assessing an impact of said cyber-attack scenario on said aircraft simulation as a whole and on said different module.

19. The computer program product of claim 16 comprising further program code, stored on said non-transitory computer readable medium, for:

generating a modified cyber-attack simulation;

generating a modified cyber defense simulation;

generating a modified cyber-attack scenario comprising said modified cyber-attack simulation and said modified cyber defense simulation;

launching said modified cyber-attack scenario against said aircraft simulation; and assessing an impact of said modified cyber-attack scenario on said aircraft simulation as a whole and said on isolated ones of said plurality of modules.

20. The computer program product of claim 16 wherein said cyber-attack simulation comprises an attack vector simulation.

* * * * *